Feb. 20, 1945.  C. A. DOUGHERTY  2,370,019
VEHICLE RACK
Filed May 1, 1943  4 Sheets-Sheet 1
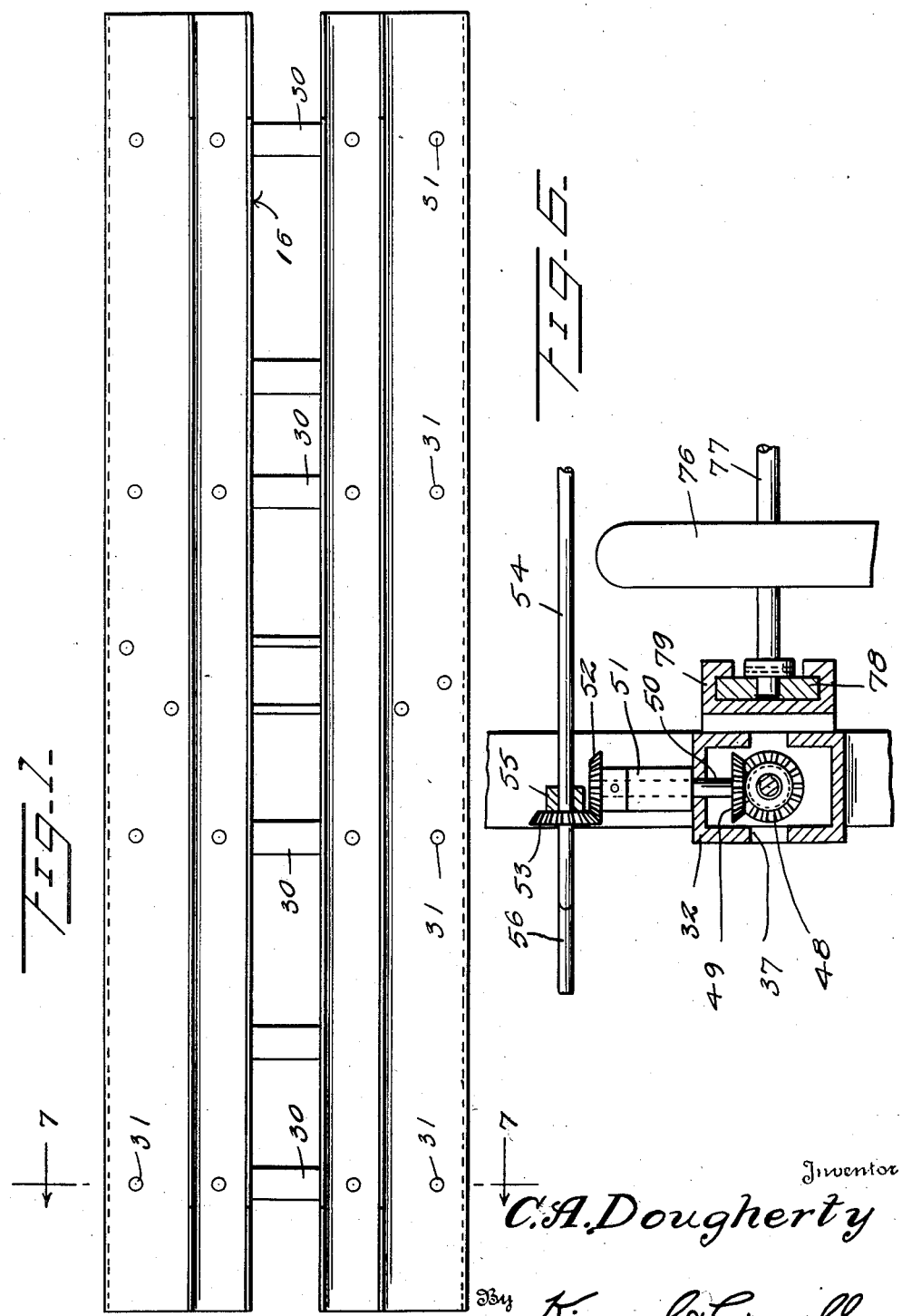
Inventor
C. A. Dougherty
By Kimmel & Crowell
Attorneys

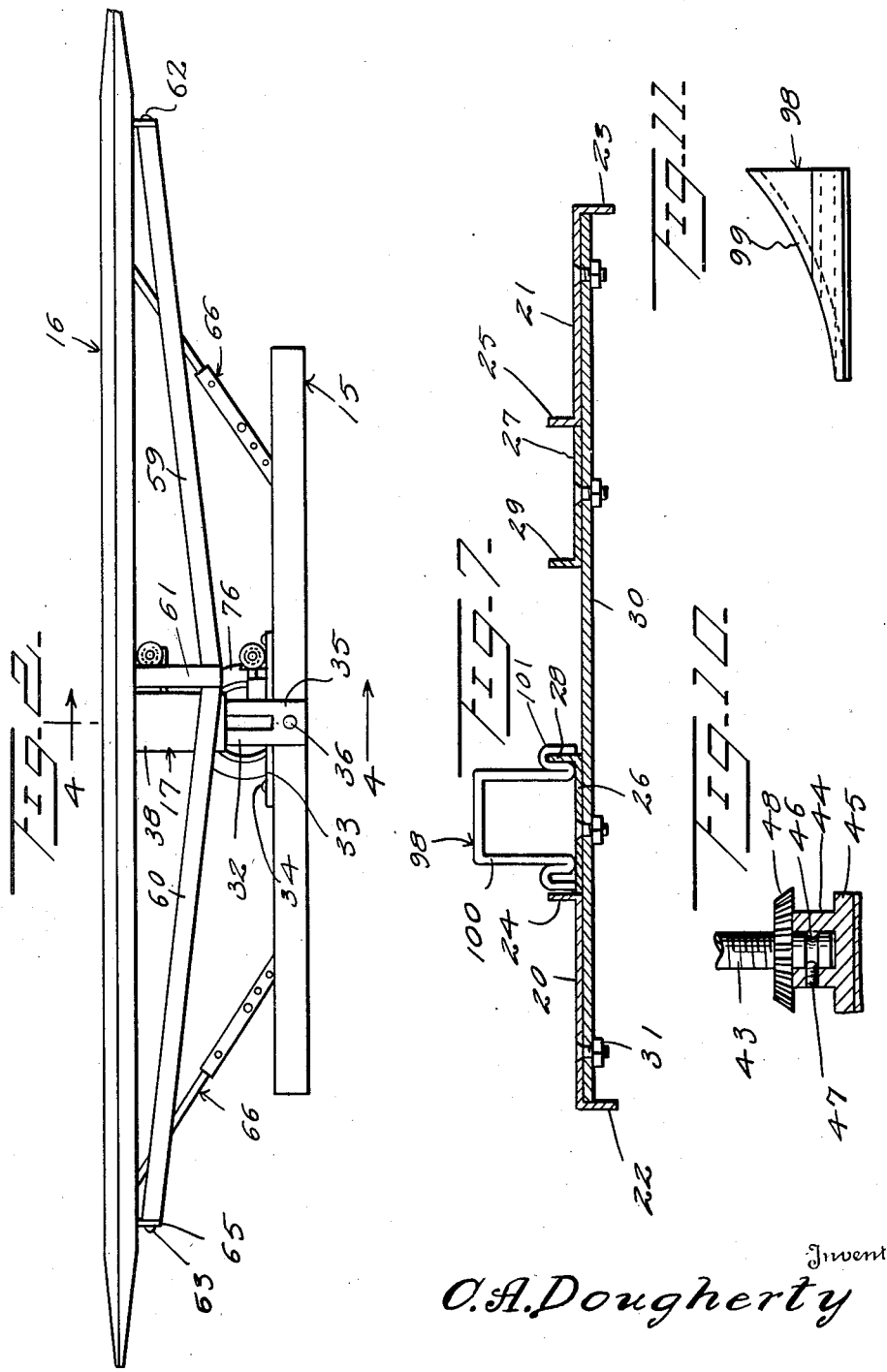

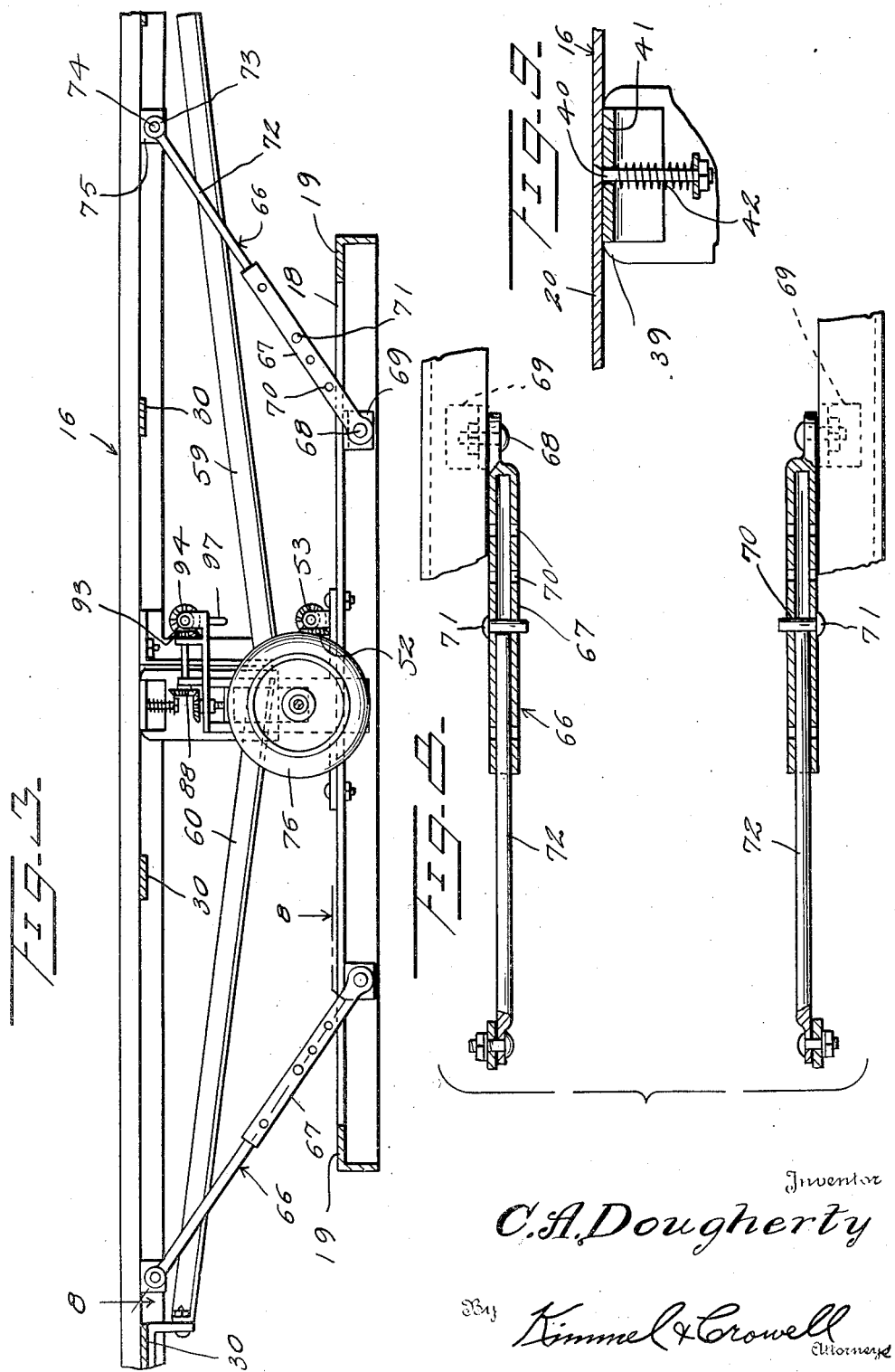

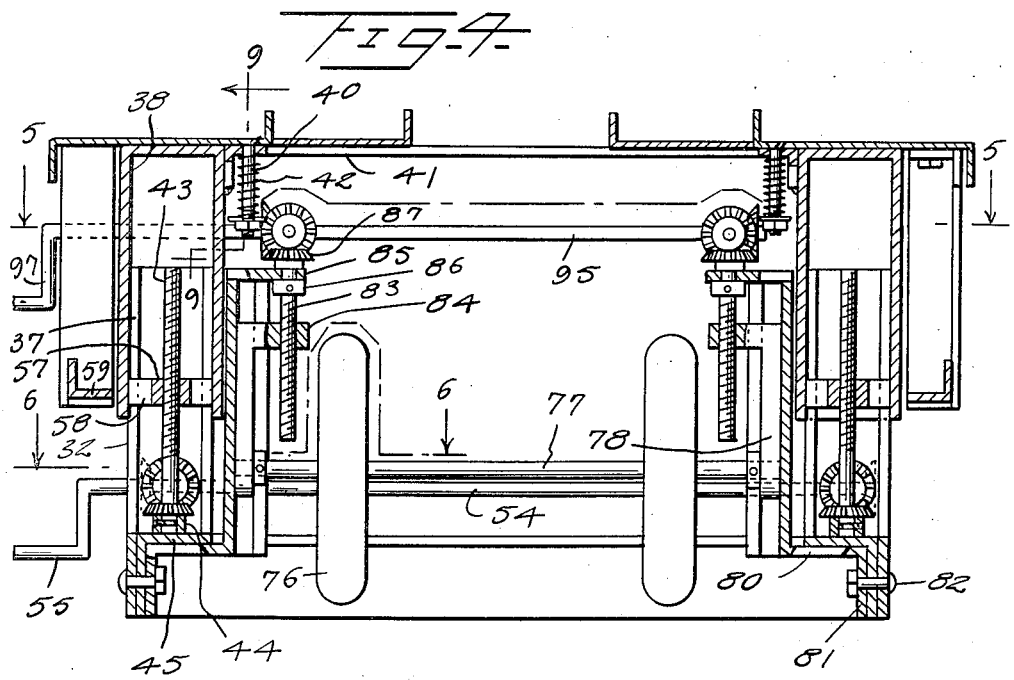

Patented Feb. 20, 1945

2,370,019

UNITED STATES PATENT OFFICE 2,370,019

VEHICLE RACK

Charles A. Dougherty, Wilmington, Del.

Application May 1, 1943, Serial No. 485,375

3 Claims. (Cl. 214—1)

This invention relates to a combined vehicle rack and loading or unloading ramp.

An object of this invention is to provide a portable combined rack and loader which may be adjusted to any desired angle, the mounting or support being such that one end of the device may be elevated higher than the other end.

Another object of this invention is to provide a rack of this kind wherein the vehicle may run up on the inclined ramp and then the ramp may be swung to a horizontal position so as to thereby permit working on the under parts of the vehicle.

A further object of this invention is to provide a swingable ramp which includes a jacking device so that the ramp may be elevated in either an inclined position or a horizontal position.

A further object of this invention is to provide an adjustable rack of this kind which includes a base having retractible wheels so that when the wheels are in extended position the device can easily be shifted about, and when the wheels are in retracted position a solid base structure will be provided.

A further object of this invention is to provide a rack of this kind which includes telescoping bracing members which may be easily adjusted to hold the ramp or runway in any selected position.

A further object of this invention is to provide a device which can be used as an emergency bridge, the runway being of truss-like form capable of supporting the device between a pair of abutments with the ends of the runway resting on the abutments or sides of a gully.

The device will also be useful with portable repair or service units for facilitating the repair or servicing of vehicles or other mobile equipment, the portability of the device permitting its attachment to the rear of a vehicle or other tractor element for transfer from one point to another.

With the foregoing objects and others which may hereinafter appear, the invention consists of the novel construction, combination and arrangement of parts as will be more specifically referred to and illustrated in the accompanying drawings wherein is illustrated an embodiment of the invention, but it is to be understood that changes, modifications and variations may be resorted to which fall within the scope of the invention as claimed.

In the drawings:

Figure 1 is a top plan of a portable vehicle rack or ramp constructed according to an embodiment of this invention, Figure 2 is a detail side elevation of the device with the ramp in a horizontal position, Figure 3 is a longitudinal section taken substantially through the center of the device, Figure 4 is a sectional view taken on the line 4—4 of Figure 2, Figure 5 is a fragmentary sectional view taken on the line 5—5 of Figure 4, Figure 6 is a fragmentary sectional view taken on the line 6—6 of Figure 4, Figure 7 is a sectional view taken on the line 7—7 of Figure 1, Figure 8 is a fragmentary sectional view taken on the line 8—8 of Figure 3, Figure 9 is a sectional view taken on the line 9—9 of Figure 4, Figure 10 is a fragmentary sectional view of the lower portion of one of the ramp elevators, and Figure 11 is a detail side elevation of a chock block used with this invention.

Referring to the drawings, the numeral 15 designates generally a base structure which is of rectangular configuration and the numeral 16 designates generally a ramp or runway structure supported above the base 15 by means of a pair of extensible standards or supporting members 17.

The base 15 comprises a pair of longitudinal angle members 18 connected together at their ends by end angle members 19. The ramp or runway 16 as shown in Figures 1 and 7 is formed of a pair of outer elongated plates 20 and 21 which are formed at their outer margins with depending bracing flanges 22 and 23, respectively.

The plate 20 at its inner edge is formed with an upstanding flange 24 and the plate 21 is formed at its inner edge with an upstanding flange 25. A pair of inner plates or runway forming members 26 and 27 are disposed between the two runway forming plates 20 and 21 and are slightly narrower than the outer plates 20 and 21. The inner plate 26 is formed at its inner edge with an upstanding flange 28 and the inner plate 27 is formed at its inner edge with an upstanding flange 29. The outer and inner runway forming members are connected together by means of a plurality of transversely extending connecting bars 30 which are secured to the runway forming members by fastening members 31.

The flanges 24 and 25 are spaced apart a distance sufficient to engage between a pair of wheels or other tread elements having a normal or standard tread, whereas the flanges 28 and 29 are adapted to engage between wheels or other tread forming members of vehicles having a reduced tread. The extensible standards 17 are of like construction and are shown in greater detail in Figures 4 and 5. These extensible standards include a lower hollow column 32 which may be provided with outwardly extending base flanges 33 secured as by fastening members 34 to the base 15. The column 32 may be provided with a downwardly extending plate 35 engaging over the outer side of the frame 15 and secured thereto by one or more fastening members 36. The column 32 is provided with opposed vertically disposed slots 37, the purpose for which will be hereinafter described.

An upper column member or standard 38 is adapted to telescope the lower standard member 32 and is provided, as shown in Figure 9, with rounded upper corners 39 to permit the rocking of the runway or ramp 16 relative to the upper end of the column 17. The runway or ramp 16 is adapted to be rockably secured to the upper ends of the two standards or columns 17 by means of a pair of bolts 40. The bolts 40 extend downwardly through the plates 20 and 21, loosely engaging through angle members 41 secured to the inner side of the upper standard members 38. A spring 42 is disposed about each bolt 40 below the angle member 41 and provides a retaining means to normally maintain the runway or ramp 16 at right angles to the standards 17, but permitting forcible rocking of the runway 16 on the upper ends of the standards 17. In other words, the springs 42 with the bolts 40 provide a resilient means connecting the ramp or runway 16 to the standards 17. This type of connection also permits the ready removal of the runway 16 from the standards 17.

In order to provide a means whereby the standard 17 may be extended or retracted so as to either raise or lower the runway or ramp 16, I have provided a jack structure within each standard 17. This jack structure includes a vertically disposed threaded shaft 43 which is mounted at its lower end in a bearing 44 fixed to the bottom wall 45 of the inner standard 32. The lower end of the shaft 43 may be provided with an annular groove 46 as shown more clearly in Figure 10, and a set screw or other retaining member 47 may be threaded through the bearing 44 and engaged in the groove 46. A lower bevel gear 48 is fixedly secured to the shaft 43 and a second bevel gear 49 fixed to the inner end of a countershaft 50 is adapted to mesh with the lower gear 48. The shaft 50 is journaled through the adjacent side of the lower standard 32 and is journalled in a bearing 51 which is fixed relative to the lower standard 32. An outer bevel gear 52 is fixed to the outer end of the countershaft 50 and meshes with a bevel gear 53 carried by an operating shaft 54. The shaft 54 extends transversely across the frame 15, being journalled in bearings 55 carried by the frame 15, and the shaft 54 at one end thereof may be provided with a crank 56. If desired, the crank 56 may be removable relative to the shaft 54.

The upper standard member 38 has secured thereto a nut 57 which is carried by a pair of arms 58 fixed to the inner portion of the upper standard member 38. The shaft 43 engages through the nut 57 so that rotation of the shaft 43 by means of the drive shaft 54 in one direction will raise the upper standard members 38 and raise the ramp or runway 16. Rotation of the shaft 54 in the opposite direction will lower the ramp or runway 16.

The runway 16 is preferably made of truss-like form so that it will be self-supporting between the ends thereof in order to permit positioning the ends of the runway on a pair of spaced abutments or on the opposite sides of a gully to thereby provide a bridge over the gully. The ramp or runway 16 is braced by means of pairs of downwardly convergent bracing members 59 and 60 which are secured at their lower convergent ends to vertical bracing members 61. The bracing members 61 are secured at their upper ends to the lower side of the ramp or runway 16 and are secured at their lower ends in any suitable manner such as by welding or other fastening means to the abutting ends of the bracing members 59 and 60. The outer ends of the bracing members 59 and 60 are secured by fastening members 62 and 63, respectively, to angle members 64 and 65, respectively, which are secured to the outermost transverse connecting bars 32.

In order to provide a means whereby the ramp or runway 16 may be firmly held in either a horizontal position or in a selected angular position, I have provided pairs of extensible bracing members generally designated as 66. The bracing members 66 include a tubular member 67 which is pivotally mounted on a pivot 68 carried by an angle member 69 secured to the base 15. The tubular member 67 is formed with a plurality of holes 70 through which removable pins 71 are adapted to selectively engage. The bracing members 66 also include an upper bracing member 72 which is adapted to slidingly engage in the tubular member 67. The bracing member 72 is flattened, as at 73, and pivotally mounted on a pivot member 74 carried by a depending angle member 75 which is fixed to the lower side of the runway or ramp 16.

The lower or inner end of the bracing member 72 is adapted to engage against the pin 71 to limit the inward movement of the upper bracing member 72. The lower tubular bracing member 67 may be provided with any desired number of holes 70 so that the runway or ramp 16 may be angularly adjusted with respect to the standards 17 to the desired degree. When the runway or ramp 16 is angularly adjusted, the runway or ramp will pivot on the upper ends of the standards 17 against the tension of the springs 42.

A pair of wheels 76 are mounted on a wheel shaft 77 which is journalled between a pair of vertically adjustable slide members 78. The slide members 78 are slidably mounted in vertically disposed guide members 79, as shown more clearly in Figure 6, which are of substantially C-shape with the open sides thereof innermost. The lower ends of the guides 79 are formed with outwardly extending base members 80 terminating at their outer ends in a right angularly disposed extension 81 which may be secured as by fastening members 82 to the vertical flanges of the side members 18 of the base 15. The slide members 78 are adapted to be vertically shifted to either an upper retracted position or a lower extended position by means of threaded shafts 83. The shafts 83 threadably engage through inwardly projecting nuts 84 fixed to the upper portions of the slide members 78. Each shaft 83 is journalled through an inwardly projecting support or bearing 85 which is carried by the upper end of the guide 79. A collar 86 may be secured about the shaft 83 below the bearing 85. A gear 87 is fixed to the upper end of each shaft 83 and meshes with a bevel gear 88 carried by a countershaft 89.

The countershaft 89 is journalled in a bearing 90 carried by the upper end of the bearing plate 85 and is also journalled in an outer bearing 91 carried by a supporting arm or bracket 92. The supporting arm or bracket 92 is fixed to the adjacent outer side of the guide member 79. The outer end of the countershaft 89 has secured thereto a beveled gear 93 which meshes with a bevel gear 94. The bevel gear 94 is mounted on a crank shaft 95 which is journalled in bearings 96 carried by the outer ends of the brackets 92. The shaft 95 is disposed above the shaft 54 and may be provided at one end thereof with a crank or handle 97 which, if desired, may be removable. Rotation of the crank shaft 95 in one direction will rotate the screw shafts 83 in a direction to lower the slide members 78 and thereby extend the wheels 76 below the base frame 15. Rotation of the crank shaft 95 in the opposite direction will raise the slide members 78 and the wheels 76 to a retracted position, which is the position shown in Figure 4.

In the use and operation of this device, assuming that a vehicle is to be loaded onto a car or other vehicle, the ramp 16 may be swung downwardly at one end thereof by withdrawing the adjacent pair of locking pins 71 in the adjacent bracing members 66. Preferably, the pivot bolts 40 engage through the ramp 16 at one side of the transverse median of the ramp so that one end of the ramp will be longer than the other end with respect to the pivot bolts. Any selected end may be lowered and may be locked in the angular position by inserting the locking pins 71 in the pair of bracing members 66 which are extended.

In the event the upper raised end of the ramp or runway 16 is not high enough the jack structure including the shafts 53 may be operated by the crank shaft 54 to raise or extend the supporting standards 17.

It will be assumed that at this time the wheels 76 are in their retracted position and the base 15 is disposed on the ground or other plane surface. Where the device is to be used for servicing a vehicle, the device may be positioned in its angular position with one end of the runway 16 resting on the ground and the other end elevated. When the vehicle is in substantially the center of the runway, the runway will balance and may be locked in its balanced position by the locking pins 71 which prevent movement of the bracing members 66. The vehicle and runway 16 with the runway in a horizontal position may be either elevated or lowered by operation of the jack shafts 43.

In the event it is desired to move or shift the entire structure, the wheels 76 may be extended by operating the crankshaft 95 so as to lower the slides 78 and the wheels 76 below the base 15. If it is desired to use the structure hereinbefore described as a temporary or emergency bridge over a gully or other depression, the opposite ends of the runway 16 may be mounted on the opposite sides of the gully or depression, with the base 15 suspended below the runway 16, or with the runway removed from the standards.

Where a vehicle is mounted on the runway 16, this vehicle may be limited in its movement along the length of the runway 16 by chock blocks of the type shown in Figures 7 and 11 and designated 98. The chock blocks 98 include an arcuate wheel engaging side 99, vertical sides 100 and reverted downwardly opening channel members 101. The channel members 101 are adapted to engage over selected ones of the flanges 24, 25, 28 and 29 depending on the width of the tread of the vehicle and these chock members 98 may be locked or otherwise secured against lengthwise movement on the selected upstanding flanges by any suitable locking means.

What I claim is:

1. A vehicle rack comprising a base, a pair of upstanding standards carried by said base, said standards having flat upper ends, a ramp resting on the flat upper ends of said standards, bolts loosely engaging through said ramp and engaging said standards, and springs about said bolts adapted to normally maintain said ramp in a horizontal position.

2. A vehicle rack comprising a base, a pair of upstanding standards carried by said base, said standards having flat upper ends, a ramp resting on the flat upper ends of said standards, bolts loosely engaging through said ramp and engaging said standards, springs about said bolts adapted to normally maintain said ramp in a horizontal position, and adjustable bracing members connecting said ramp with said base, said bracing members being disposed on opposite sides of said standards.

3. A vehicle rack comprising a base, a pair of upstanding standards carried by said base, said standards having flat upper ends, a ramp resting on the flat upper ends of said standards, bolts loosely engaging through said ramp and engaging said standards, springs about said bolts adapted to normally maintain said ramp in a horizontal position and pairs of bracing members connecting said ramp with said base, each bracing member including a tubular member formed with a plurality of openings, a rod telescoping into said tubular member, and a pin removably engaging in selected openings for holding said rod against inward movement.

CHARLES A. DOUGHERTY.